June 12, 1962  A. W. SIMPSON  3,038,576
TORQUE LIMITING AND OVERLOAD SENSING DEVICE
Filed May 24, 1960  3 Sheets-Sheet 1

INVENTOR.
ARTHUR W. SIMPSON
BY Bosworth, Sessions,
Herrstrom & Knowles
ATTORNEYS.

June 12, 1962  A. W. SIMPSON  3,038,576
TORQUE LIMITING AND OVERLOAD SENSING DEVICE
Filed May 24, 1960  3 Sheets-Sheet 3

INVENTOR.
ARTHUR W. SIMPSON
BY Bosworth, Sessions
Herrstrom & Knowles
ATTORNEYS.

United States Patent Office 3,038,576
Patented June 12, 1962

3,038,576
TORQUE LIMITING AND OVERLOAD
SENSING DEVICE
Arthur W. Simpson, Maple Heights, Ohio, assignor, by mesne assignments, to The Siegler Corporation, Los Angeles, Calif., a corporation of Delaware
Filed May 24, 1960, Ser. No. 31,339
8 Claims. (Cl. 192—150)

This invention relates to two-way torque limiting devices, and to drive systems and hoisting apparatuses embodying such devices; and more particularly it relates to a torque limiting device providing different overload torque limits in both directions of rotation and to drive systems and apparatus embodying such devices.

Although the torque limiting devices of the invention are capable of wide application, they will for convenience be discussed in connection with power operated hoisting apparatus, in which they provide particular advantages.

Power operated hoisting apparatus should be reliable in operation, have long service life and require a minimum of maintenance or repair. It should be safe; in particular it should not allow the load supported by the hoisting apparatus to lower or drop when the power is cut off intentionally or due to power failure. It should include overload release means to prevent operation, and preferably to cut off the power, in the event the apparatus is loaded beyond a predetermined limit.

To insure that the load is not lowered or dropped in case of power cut-off, an irreversible drive, such as an intermeshing worm and worm wheel, is usually included in the drive system between the power source and the shaft actuating the hoisting element; the irreversible drive requires that the power source operate both on raising and on lowering the load.

When overload release protection is required on load hoisting only, it is a simple matter to use current limiting means, or a one-way slip clutch in the drive, or similar expedients. However, in certain applications it is imperative that overload release means be provided to prevent operation of the hoisting apparatus on lowering as well as on hoisting the load, particularly when maximum dependability of the hoisting device is required (as in the handling of dangerous loads), and when maximum freedom from maintenance and repair are necessary (as when the hoisting device is employed in services where repair and maintenance facilities are not readily available). The problem of providing such overload release protection on both lowering and hoisting of the load is difficult when a worm and worm wheel or similar irreversible drive is used, since the friction of the irreversible drive is greater on raising the load than on lowering it. Consequently, if the same overload torque limit is provided on lowering as on hoisting, a load which will not cause an overload on lowering can cause an overload on hoisting, resulting in difficulties such as inability of the hoisting apparatus to raise the load in an emergency, or damage to the apparatus, or even damage to the load.

In the interests of safety and dependability, it is also desirable that such hoisting apparatus include, between the power source and the irreversible drive, means permitting the power source to rotate such irreversible drive only while the power source develops torque exceeding a predetermined minimum value sufficient to handle a load within the capability of the apparatus. The combination of this means with that providing overload release both on lowering and raising the load is extremely desirable and advantageous since it insures that power is transmitted to the hoisting element only when the torque magnitude is within a predetermined range in which the torque is great enough to handle the load but is not great enough to handle an overload either on hoisting or lowering.

Major objects of the invention are to provide two-way torque limiting devices, and drive systems and hoisting apparatus embodying such devices, which overcome the problems, satisfy the requirements, and provide the advantages indicated above. A further object of the invention is the provision of a torque limiting device which provides a higher torque limit in one direction of rotation than the other. Another object is to provide a drive system comprising a power source, a two-way torque limiting device, and a two-way torque sensing device located between the power source and the torque limiting device, to insure that in either direction of rotation torque is transmitted that exceeds a minimum predetermined value but does not exceed a maximum predetermined value for the direction of rotation. It is a further object of the invention to provide hoisting apparatus comprising a power source, an irreversible drive having a higher friction in one direction of rotation or load hoisting than in the other direction or load lowering, and a two-way torque limiting device having a higher torque limit in one direction of rotation than the other to compensate for such difference in the frictions of the irreversible drive, to prevent overloading on either hoisting or lowering. It is another object to provide such a hoisting apparatus embodying a two-way torque sensing device in the drive to the torque limiting device, to insure that torque transmitted to the torque limiting device is great enough to operate the device in the operating range of loads on hoisting and lowering. Other objects include the provision of such torque limiting devices, drive systems, and hoisting apparatuses which are of simple and sturdy construction, which have a high degree of safety and reliability, and which can be manufactured at low cost.

These and other objects and advantages of the invention will become apparent from the following description of a preferred form thereof, reference being made to the accompanying drawings, in which.

Figure 1:
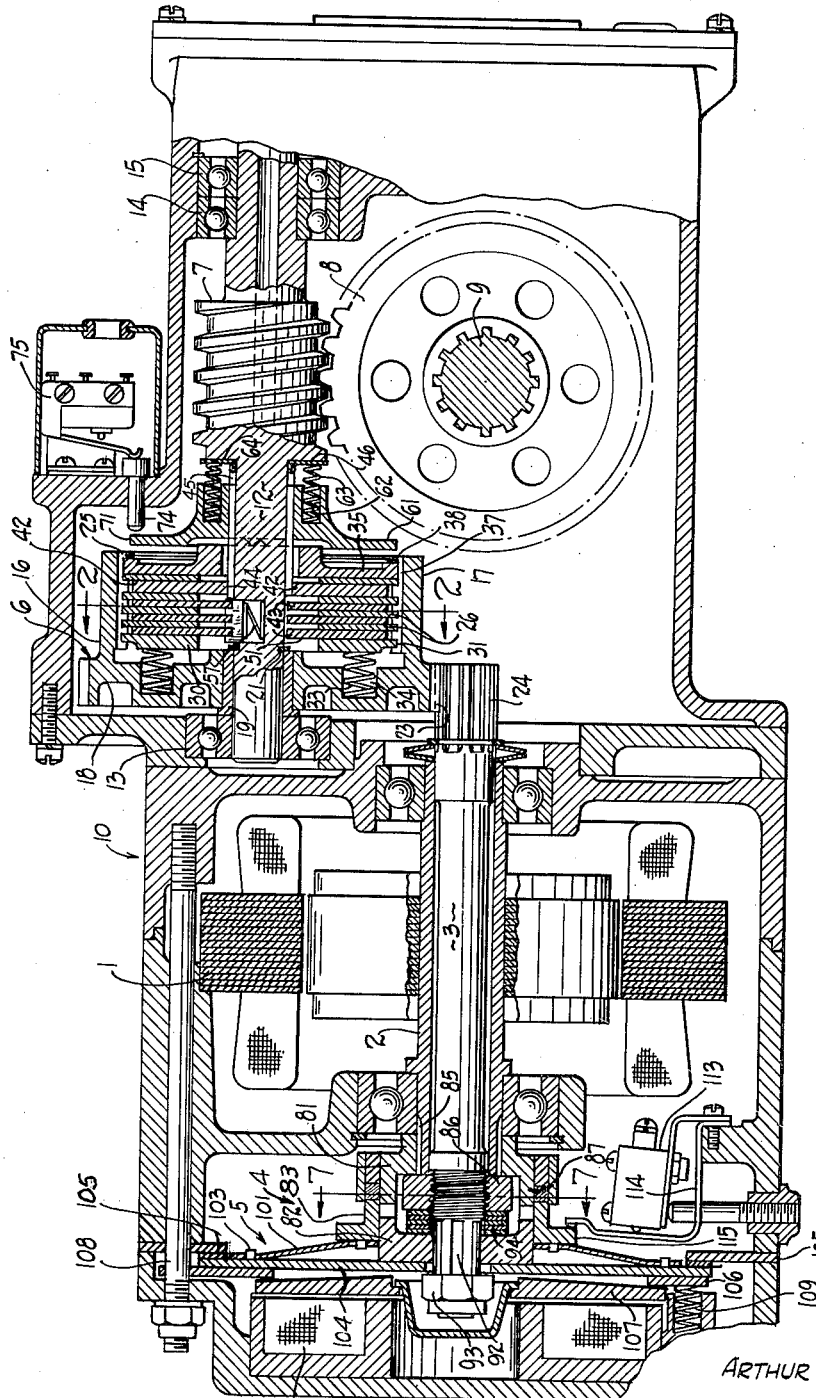
FIGURE 1 is a longitudinal sectional elevation of a hoisting apparatus embodying the invention.
Figure 8:
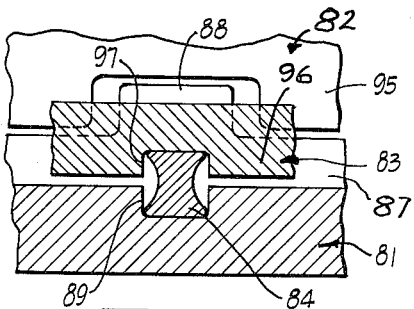
FIGURE 8 is a detail to an enlarged scale of a portion of the torque sensing device, generally corresponding to line 8—8 of FIGURE 7, showing the relationship of one of the torque sensing elements and its associated parts when torque of the desired predetermined minimum amount has not been exceeded.
Figure 9:
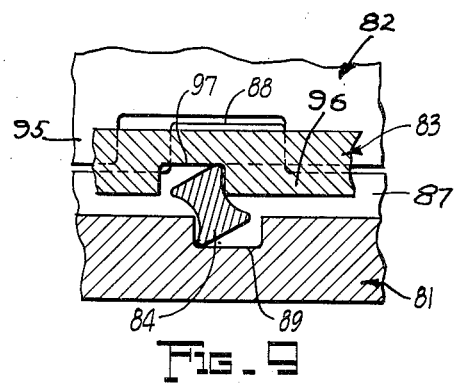
Figure 10:
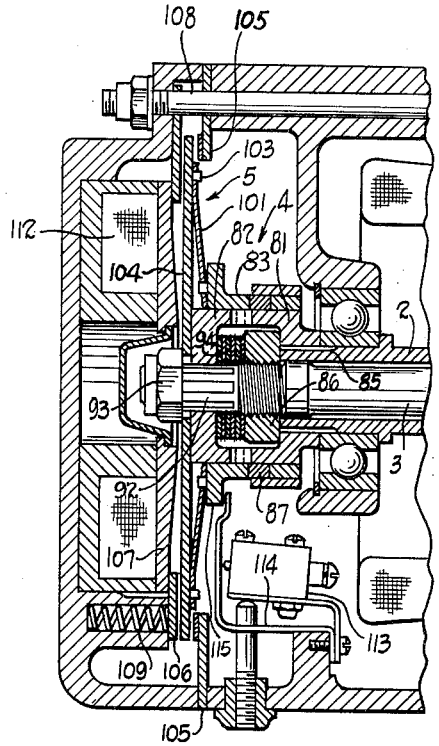

FIGURE 9 is a detail, to the same scale as FIGURE 8 and showing the same parts in their relative positions after torque of such predetermined minimum amount has been exceeded; and FIGURE 10 is an elevation, corresponding generally to the left hand portion of FIGURE 1 and to the same scale, showing the relation of the parts of the torque sensing device and its associated brake, as a whole, when torque exceeding a desired predetermined minimum amount has been developed by the motor, the brake has been released, and power is being transmitted to the torque limiting device.

The hoisting apparatus shown comprises a reversible electric motor 1 having a hollow shaft 2 adapted to rotate a drive shaft 3 concentrically journalled in shaft 2; rotation of such shaft 3 is governed by a torque sensing device 4 which controls brake 5 to permit rotation of shaft 3 while the motor is exerting torque exceeding a predetermined magnitude and to prevent rotation of shaft 3 if torque exceeding such magnitude is not exerted by the motor. Shaft 3 is adapted to drive, through a two-way torque limiting device 6, worm 7 which rotates a worm wheel 8 mounted on an output shaft 9 adapted to actuate the hoisting element, not shown, by means of which the load is raised and lowered. The above parts are enclosed in a suitable housing generally indicated by reference numeral 10.

The illustrated torque limiting device 6 is a two-way clutch. It comprises a shaft 12, forming part of the driven member of the device, rotatably mounted in housing 10 by means of ball bearings 13, 14 and 15 and rigidly carrying worm 7. Rotatably mounted on shaft 12 is a generally cylindrical annular member 16, which forms part of the driving member of the torque limiting device. This member 16 comprises a sleeve portion 17 fixed to a radial portion 18 rigidly mounted on a sleeve bearing 19 which rotatably supports member 16 on shaft 12. Member 16 also is constrained against movement axially of shaft 12 by a ring 21 bearing against one end of sleeve bearing 18 and by the inner race of ball bearing 13 contacting the other end of sleeve bearing 19. Member 16 also has external gear teeth 23 meshing with gear teeth 24 on the end of drive shaft 3, so that member 16 is positively rotated by shaft 3 when it is rotated by the motor 1.

The interior surface of sleeve portion 17 of member 16 is formed with several longitudinally extending splines 25. A number of clutch plates or disks 26 are mounted in sleeve portion 17; each plate has teeth 27 on its exterior edge engaging the internal splines 25 of member 16, and a central opening 28 large enough to clear shaft 12. A thrust plate 30, having on its outer edge external teeth 31 engaging the internal splines 25 of member 16 and having a central opening clearing shaft 12, is also supported by member 16 at that end of the group of clutch plates which is adjacent radial portion 18. Springs 33, carried in sockets 34 formed in radial portion 18 of member 16, axially resiliently press the thrust plate 30 against the end of the group of clutch plates 26. The other end of the group of clutch plates is thus pressed against an end plate 35; plate 35, which has a central opening clearing the shaft 12, on its outer edge has a plurality of external teeth 37 engaging the internal splines 25 of member 16. End plate 35 is limited against axial movement away from radial portion 18 of member 16 by a restraining ring 38 fitting into suitable grooves in the spline teeth 25 near the end of member 16.

Thrust plate 30 and end plate 35 are preferably formed of steel, and clutch plates 26 are preferably formed of bronze, although these parts may be formed of other suitable materials. In the illustrated device, the radial surfaces of these plates are smooth and flat, constituting clutch surfaces on members 26 and 30. Since the teeth on the outer edges of plates 26, 30 and 35 engage the splines 25 of member 16, the plates are capable of limited axial but no rotational movement relative to member 16. They are capable of axial and rotational movement relatively to shaft 12 since they are not attached to the shaft. Member 16, plates 26, 30 and 35, and springs 33 thus are included in the driving clutch member.

The driven clutch member comprises the driven shaft 12, a clutch plate 42 which is mounted on shaft 12 to rotate with and drive the shaft in either direction of rotation while being capable of limited axial movement relative to the shaft; and a plurality of clutch plates 43 mounted to rotate with and drive shaft 12 when they rotate in one direction and to slip rotationally relative to shaft 12 when they rotate in the other direction, the plates 43 also being capable of limited axial movement relatively to shaft 12. The clutch plates 42 and 43 of the driven member are interleaved with the plates 26 and 30 of the driving member, the plates being held in driving engagement by the springs 33.

More specifically, the clutch plate 42 has internal teeth 44 which engage external splines 45 on the shaft 12. These splines extend from a shoulder 46 on worm 7 toward the radial portion 18 of member 16 only sufficiently to permit them to engage the teeth 44 of the clutch plate 42. The outer edges of clutch plates 42 and 43 clear the internal splines 25 of member 16. Each clutch plate 43 also has a central opening 49, surrounding a portion 51 of shaft 12, which is formed so that a major portion of its wall, preferably for about 270°, is an arc 52 of a circle closely fitting portion 49 of shaft 12 and the minor remaining portion of its wall comprises an outwardly expanding or tapered portion 53 terminating in a shoulder 54. The section 51 of shaft 12, which is smaller than the root diameter of splines 45, has a radially opening rectangular pocket 55, the major axis of which extends axially of shaft 12. A key 56 closely fits in pocket 55 for slidable movement radially of shaft 12. A suitable spring 57, disposed between the bottoms of the pocket and the key, resiliently urges the key 56 radially outward into contact with the wall of the opening 49 in each plate 43; in the illustrated embodiment there are three such plates 43, each of which contacts key 56.

Figure 2:
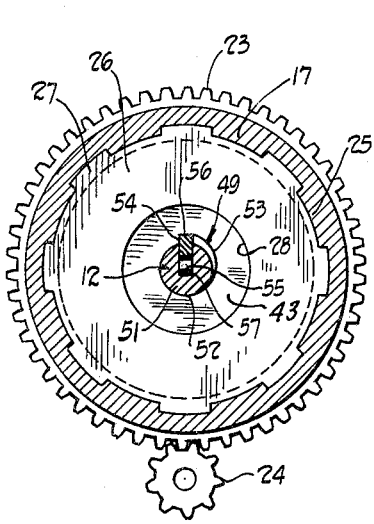
FIGURE 2 is a sectional elevation along line 2—2 of FIGURE 1, showing the position of the driving key in the driven shaft of the torque limiting member during the direction of rotation in which all clutch plates of the driven member are utilized to transmit torque to the drive shaft.
Figure 3:
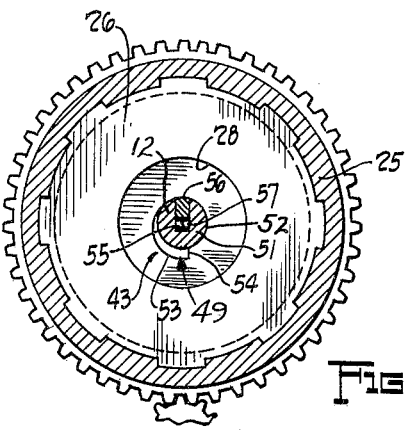
FIGURE 3 is a sectional elevation corresponding generally to FIGURE 2 showing the position of the driving key in the driven shaft of the torque limiting member during the opposite direction of rotation in which certain of the clutch plates of the driven member do not transmit torque.

Therefore, when the plates 43 are rotated in one direction by the contacting plates of the driving clutch member, the shoulders 54 of plates 43 contact the key 56 in shaft 12 in positive driving engagement, thus causing the plates 43 to transmit torque to, and aid plate 42 in rotating, the shaft 12, as shown in FIGURE 2. However, when the plates 43 are rotated in the opposite direction by the contacting plates of the driving member, they transmit no torque, since in this direction of rotation they are not in driving engagement with shaft 12. When the resistance to rotation of shaft 12 exceeds the torque which can be transmitted by the clutch surfaces of the single plate 42 keyed to the drive shaft 12 and plate 42 slips relatively to the adjacent clutch plates 26 of the driving member, the clutch plates 43 slip rotationally relatively to shaft 12. During each such relative rotation between the plates 43 and the shaft 12, the wall of the opening 49 in each plate 43 slides past key 56, the tapered portion 53 of the opening 49 forcing the key inwardly, the circular arc portion 52 holding the key in its innermost position, and the shoulder 54 permitting the key to spring outwardly to recommence the cycle. FIGURE 3 shows one of the relative positions of shaft 12, key 56 and one of plates 43 during such relative rotation of plates 43 and shaft 12, the plate being shown rotating and the shaft stationary.

Plates 42 and 43 are preferably formed of steel and have smooth and flat radial clutch surfaces, although they may be formed of other suitable materials and have other suitable configurations. The contacting clutch surfaces of driving plates 26 and 30 and the interleaved adjacent driven clutch plates 42 and 43 in the stack of clutch plates are pressed together between thrust plate 30 and end plate 35 by springs 33 exerting a predetermined pressure on thrust plate 30. Such pressure, together with the frictional characteristics of the clutch surfaces and the number of clutch surfaces which transmit torque determine the torque limit in either direction beyond which slippage will occur between clutch surfaces of plates keyed to driving member 16 and clutch surfaces of plates keyed to driven shaft 12. When the driving member 16 is rotated by shaft 3 in the direction which causes the shoulders 54 of the plates 43 to bear against the key 56 in shaft 12, which is the clockwise direction in FIGURE 2, all clutch plates 42 and 43 drive shaft 12 and hence all clutch surfaces of these plates are in driving relation with abutting clutch surfaces of plates 26 and 30 splined to driving member 16. In this direction of rotation, the torque limit therefore is that resulting from the pressure of springs 33 and the friction between the clutch surfaces of all plates 42 and 43 of the driven member and the contacting surfaces of plates 26 and 30 of the driving member, and is the higher of the two torque limits provided in the device. The hoisting apparatus and the torque limiting device 6 are so designed that this higher torque limit is available on hoisting the load.

A lower torque limit is provided when the member 16 is rotated by the shaft 3 in the direction opposite to that described above, which is the counterclockwise direction in FIGURE 3. In this case only plate 42 is in driving relation through contact of its clutch surfaces with the abutting clutch surfaces of adjacent plates 26 of member 16; the plates 43 cannot assist in driving shaft 12 since they cannot transmit torque because of the above described slippage permitted by the opening 49, key 56 and spring 57. The torque limit is therefore that established by the pressure of springs 33 and the friction between the two clutch surfaces of plate 42 and the contacting clutch surfaces of adjacent plates 26 of the driving member; this torque limit is the lower of the two limits provided by the torque limiting device. The hoisting apparatus and torque limiting device 6 are so designed that htis lower torque limit governs when the load is being lowered. The difference in these higher and lower torque limits compensates for the difference in the friction between worm 7 and worm wheel 8 when the load is being raised and the friction between these elements when the load is being lowered.

The slippage between the clutch plates splined to member 16 and those in driving relation to drive shaft 12 causes relative rotation between end plate 35 and shaft 12 when the torque limit is exceeded in either direction of rotation; thus relative rotation is utilized to disconnect the motor 1 when the torque limit is exceeded.

Figure 6:
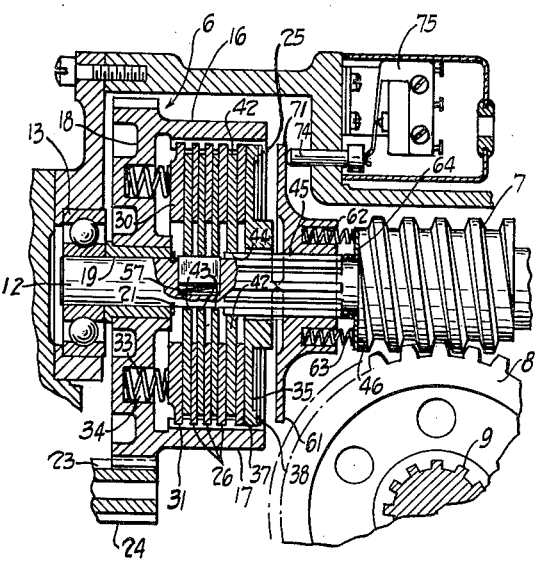
FIGURE 6 shows a portion of the apparatus of FIGURE 1, showing the complete torque limiting device with its parts in their relative positions when overload slippage is occurring and the power switch is being actuated to cut off the power to the motor.
Figure 4:
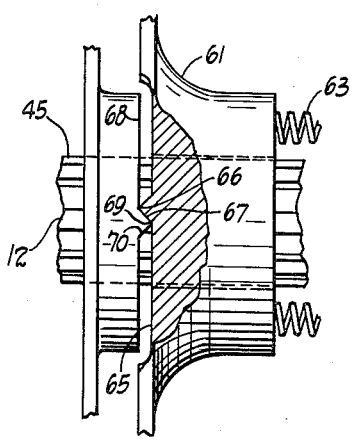
FIGURE 4 is a detail elevation to an enlarged scale of a portion of the torque limiting device of the apparatus of FIGURE 1, showing the relation of portions of the driving member and an actuating member of the driven member for controlling a power switch, when overload slippage is not occurring between the driving and driven members.
Figure 5:
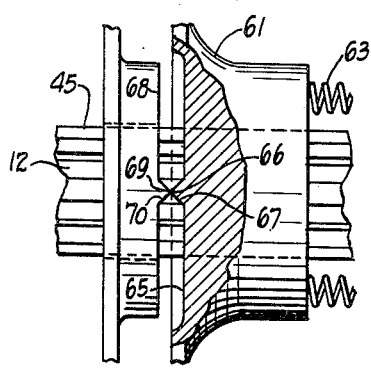
FIGURE 5 is a detail elevation of the parts of FIGURE 4, showing their relative positions when overload slippage is occuring in either direction of rotation.

To this end, and as illustrated in FIGURES 1, 4, 5 and 6, an actuating member 61 is slidably keyed to the splines 45 of the shaft so it cannot rotate relatively to the shaft. Member 61 has a plurality of sockets 62 containing axially extending expansion type springs 63 which bear against the shoulder 46 forming the end of worm 7 and resiliently urge member 61 toward end plate 35; preferably a flanged sleeve member 64 embodying guide means for the spring ends locates and secures the unsocketed ends of springs 63 at the worm 7. As shown to advantage in FIGURES 4, 5 and 6, actuating member 61 comprises a generally radially extending surface 65 interrupted by two oppositely radially extending raised ramps 66 having two inclined sides 67, and end plate 35 has a generally radially extending surface 68 facing surface 65 and interrupted by two oppositely radially extending raised ramps 69 having two inclined sides 70. When members 35 and 61 are not relatively rotating, the springs 63 cause the ramps 66 of member 61 to bear against radial surface 68 of member 35 and ramps 69 of member 65 to bear against surface 65 of member 61, as shown in FIGURES 1 and 4. When, however, there is relative rotation in either direction between member 35 and shaft 12 having member 61 keyed to it, the ramps 69 of member 35 slide over and past the ramps 66 of member 61, thus causing the member 61 to be momentarily forced away axially from member 35 against the pressure of springs 63, as shown in FIGURES 5 and 6.

Actuating member 61 also has a generally radially extending flanged portion 71, adapted to depress plunger 74 of microswitch 75 when, as described above, the member 61 moves axially away from member 35. Microswitch 75 is connected to the motor 1 by suitable circuit means not shown, so that when the plunger 74 is depressed the motor is disconnected electrically and can no longer supply power. Preferably, the microswitch 75 is of the type which must be manually reset, to aid in insuring that the conditions causing the torque limit to be exceeded are corrected before the motor is again started. Of course an automatically resetting switch may be employed if desired.

For reasons indicated above, it is also particularly advantageous to employ a brake 5 and torque sensing device 4 which releases the drive shaft 3 for rotation only after the motor has developed initial torque exceeding a predetermined magnitude and thereafter only while the motor is developing operating torque exceeding a predetermined magnitude which is lower than the initial torque limit. These torque magnitudes are well below either of the two upper limits established by the torque limiting device 6, but are sufficient when achieved to indicate that the motor is operating satisfactorily and is capable of handling loads within the capacity of the hoisting apparatus.

The illustrated torque sensing device 4, which is preferred, is like that described and claimed in copending application Serial No. 28,660 of Stewart E. Gail, which has been assigned to the assignee of the present application. As shown in FIGURES 1 and 7 to 10 inclusive, it comprises a driving member 81 fixed to motor shaft 2; a driven member 82 mounted on the end of drive shaft 3 for limited axial but no rotational movement relative to shaft 3; and a torque actuated member 83 concentrically and slidably mounted on driving and driven members 81 and 82 and adapted to engage driving member 81 through torque sensing elements 84.

Figure 7:
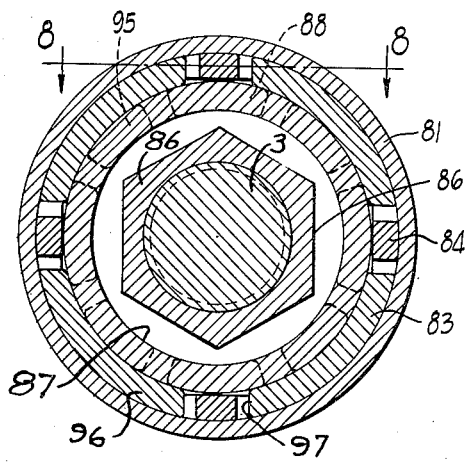
FIGURE 7 is a cross sectional elevation, along line 7—7 of FIGURE 1, of a two-way torque sensing device included in the apparatus.

Driving member 81 is mounted on the end of motor shaft 2 by splines 85 and lock nut 86; it includes an axially extending annular portion 87 formed with clutch teeth 88 separated by spaces wider than the teeth, as shown in FIGURES 7 and 9, and several axially extending pockets 89 having flat bottoms and radially extending end walls.

Driven member 82 of the torque sensing device is mounted by splines 92 on the end of drive shaft 3 and is capable of limited axial movement between nut 93 threaded to the end of drive shaft 3 and thrust member 94 bearing against lock nut 86. Driven member 82 also has axially extending clutch teeth 95 equal in width to teeth 88 and separated by wider spaces equal in width to the spaces between the teeth 88. Although teeth 95 of driven member 82 fit between the clutch teeth 88 of driving member 81 in driving relation, driving member 81 and driven member 82 are capable of relative rotation to the limit permitted by the spaces between the clutch teeth.

Torque actuated member 83, which is mounted so that it rotates with but is capable of axial movement relatively to driven member 82, comprises an annular portion 96 formed with axially extending recesses 97 corresponding in number, size and shape to the pockets 89 of driving member 81, and preferably located directly opposite the pockets in one relative rotational location of members 81 and 83, and partially offset by a predetermined amount when the clutch teeth 88 of driving member 81 and clutch teeth 95 of driven member 82 contact in driving relation. Disposed in each mating pair of a pocket 89 and a recess 97 is a torque-sensing element 84, shown in FIGURES 7 and 9, having flat top and bottom surfaces fitting closely but movably in the bottoms of the pocket 89 and recess 97 in which it is disposed and having concave sides to clear the edges of the pockets and recesses when the element 84 is tilted.

As shown in FIGURE 1, torque actuated member 83 is resiliently urged toward driving member 81 and against the torque sensing elements 84 by a dished disk spring 101, the inner portion of which is located by pins 102 in the torque actuated member and the outer edge of which is located by pins 103 located on a brake disk 104 which is fixed as by welding to the end of driven member 82. Torque actuated member 83 therefore is capable of axial movement relative to members 81 and 82 against the pressure of spring 101, but is constrained by the spring against rotational movement relatively to driven member 82. The dimensions of the torque-sensing elements 84, the number, dimensions and locations of pockets 89 and recess 97, and the pressure of spring 101 are designed to predetermine a torque limit which, when exceeded in either direction of rotation, causes the torque-sensing elements 84 to tilt and force torque actuated member 82 axially away from driving member 81 against the pressure of spring 101. It is characteristic of the illustrated torque-sensing device that once the initial tripping torque which tilts the torque-sensing elements is exceeded, further increases in torque will not affect operation of the device, and operating torque of a lower magnitude than that initial tripping torque will keep the device tripped and the brake released. Once the operating torque decreases below a magnitude predetermined by the above mentioned factors determining the tripping torque, the torque-sensing device will reset itself to its initial position, thus setting the brake and preventing rotation of shaft 3; once the torque has decreased below this lower limit further decreases do not affect the action of the device in resetting.

The outer edges of brake disk 104 are located between a braking member 105 fixed to housing 10 and having a friction surface adapted to engage one side of the brake disk 104, and a movable brake member 106 having a friction surface adapted to engage the other side of the brake disk. Movable brake member 106 is mounted on an armature member 107 guided for axial movement by housing fastener bolts 108. Axially extending springs 109, socketed in housing 10, normally press movable brake member 106 to hold brake disk 104 against rotation between the brake surfaces of the fixed and movable brake members 105 and 106.

An electromagnet 112 is located so that when energized it draws the armature 107 and the movable brake 106 toward it and away from the brake. As this occurs, pressure of the disk spring 101 causes brake disk 104 to move axially away from fixed brake member 105 to the limit of axial travel permitted by nut 93. In this position, the brake disk 104 is located between and out of contact with fixed and movable brake members 105 and 106, and is free to rotate.

A microswitch 113 is connected by suitable circuit means not shown to control energization of the electromagnet 112. The switch has a spring-type actuating arm 114 mounted so that the arm normally contacts and is pressed by a flange 115 on torque actuated member 83 when it is nearest to driving member 81 and is not rotating. When member 83 moves axially away from the driving member 81, its contact and pressure on arm 114 are relieved, causing the switch 113 to become actuated to energize the electromagnet 112.

When the illustrated hoisting apparatus is not operating, the parts are in the position shown in FIGURES 1, 4, 7, and 8. When the motor 1 is started in the desired direction of rotation, the motor shaft 2 exerts torque. If the torque exceeds the predetermined amount for which the torque-sensing device 4 is designed, the forces operating laterally on the torque-sensing elements 84 overcomes the axially directed forces resulting from pressure of spring 101, causing the torque-sensing elements to tilt and the driving member 81 to rotate relatively to driven member 82 until clutch teeth 88 on member 81 contact teeth 95 on member 82 as is shown in FIGURE 9 which shows the limiting position of these parts when the torque closing element is tripped. Tilting of the torque-sensing elements 84 causes the torque actuated member 83 to move axially away from driving member 81 against the pressure of spring 101; this movement, as was described above, causes microswitch 114 to energize electromagnet 112; the energized electromagnet draws armature 107 and movable brake member 106 toward the electromagnet against pressure of springs 109, thus permitting the brake disk 104 to move to its intermediate position where it is free to rotate. Drive shaft 3 is thus released to be positively rotated by motor shaft 2, through contact of clutch teeth 88 of driving member 81 with clutch teeth 95 of driven member 82 in the torque sensing device 4. The brake disk 104 and drive shaft 3 are released by torque 4 when the motor starts to rotate in either direction, since torque sensing device 4 is capable of operating in either direction of rotation.

Shaft 3 rotates the annular member 16 of the torque limiting device 6 through gear teeth 23 and 24; plates 26, 30 and 35 splined to member 16 rotate with it. Frictional engagement of the clutch surfaces of plates 26 and 30 of the driving member of the torque limiting device with the clutch surfaces of all plates 42 and 43 of the driven member causes plates 42 and 43 to be rotated. If the member 16 is rotated by motor 1 in the direction to cause hoisting of the load, the shoulders 54 of clutch plates 43 bear against the key 56 in shaft 12, causing plates 43 as well as plate 42 to drive the shaft 12. As indicated above this shaft rotates worm 7, which causes rotation of worm wheel 8 of the irreversible drive mechanism and output shaft 9. The torque limit, and hence the maximum load which can be lifted without overload, which results when the torque limiting device 6 is thus rotated in the direction to hoist, is, as indicated above, determined by the torque necessary to cause slippage between the engaged clutch surfaces of plates 26 and 30 of the driving member of the clutch and the clutch surfaces of all the plates 42 and 43 of the driven member of the clutch.

When the annular member 16 of the torque limiting device is rotated by motor 1 in the direction to cause the apparatus to lower the load, the drive occurs only through frictional engagement between the clutch surfaces of the clutch plate 42 splined to drive shaft 12 and the abutting clutch surfaces of the two adjoining clutch plates 26 carried by annular member 16; the clutch plates 43 transmit no torque to the shaft 12 during rotation in this direction since as indicated above, they are not engaged with the shaft. In this case the torque limit, and hence the overload limit, is that which will cause slippage between only the frictionally engaged clutch surfaces of plate 42 and adjoining plates 26.

As was indicated above, slippage of clutch surfaces due to overload in either direction of rotation causes relative rotation of member 35 of the driving member and member 61 of the driven member of the torque limiting device. The ramps 66 and 69 of members 35 and 61 slide past each other during such relative rotation, causing member 61 to move axially away from member 35 and operate the microswitch 75 to disconnect the electric motor 1 from the source of electrical energy and halt operation of the hoisting apparatus. When, as a result, there is no torque exceeding the minimum predetermined value described above, the torque-sensing elements 84 resume their untilted positions under pressure of disk spring 101, and the torque actuated member 83 moves axially so that its flange 115 presses the actuating arm 114 of the microswitch 113, thus de-energizing the electromagnet 112. The brake springs 109 then press the movable brake member 106 against the brake disk 104, causing it to be frictionally held by brake members 105 and 106 and preventing rotation of drive shaft 3. In order to place the illustrated hoisting apparatus in condition for operation again, it is necessary to remove the overload and manually reset the microswitch 75.

From the foregoing description of a preferred form of the invention, it will be evident that I have provided a two-way torque limiting device which is simple and sturdy in construction, and reliable and safe in operation, and which provides a higher torque limit in one direction of rotation than the other. When employed in connection with an irreversible drive providing greater friction in one direction of rotation than the other it provides the added advantage that the difference in torque limits can compensate for the difference in friction of the irreversible drive to provide substantially the same limit on overload at the output end of the drive for either direction of rotation. For these reasons the torque limiting device of the invention provides exceptional advantages when employed in hoisting apparatus embodying an irreversible drive which prevents lowering or dropping of the load in the event the power is cut off, since the lower torque limit on lowering the load, compensating for the lower friction of the irreversible drive on lowering the load, makes it possible to insure that no load will be handled on lowering which cannot be handled on hoisting. In the illustrated embodiment the clutch surfaces which transmit torque in one direction of rotation are so related to the clutch surfaces which transmit torque in the other direction of rotation that the difference in friction of the worm and wheel in opposite directions of rotation is compensated for to the extent that the maximum torque which can be exerted by the output shaft 9 is approximately the same in both directions of rotation, i.e., on both hoisting and lowering.

From the foregoing, it is also apparent that I have provided an extremely advantageous drive embodying the combination of a two-way torque limiting device, which has a higher torque in one direction of rotation than the other, and a two-way torque sensing device which permits the transmission of torque from a power source to the torque limiting device only when the torque supplied by the power source is greater than a predetermined minimum amount. This combination provides extremely important advantages in power transmission, since it insures that the drive will not be operative unless the torque imparted to the drive exceeds a certain predetermined amount sufficient for performance while the torque exerted by the drive is less than a predetermined limit, and such limit may be substantially the same in either direction of rotation even though irreversible drive elements are employed having different frictional resistances in different directions of rotation. It is thus possible to insure that the torque transmitted by the drive will at all times be in a safe operating range thus providing exceptional advantages in hoisting and other apparatus where such characteristics are desirable.

It will be apparent that various modifications can be made in the illustrated embodiment. For example in the torque limiting device, more than one clutch plate may be attached to the driven shaft for driving relation in either direction, a different number of clutch plates than those disclosed may be employed on both driving and driven members, and the clutching elements may take different forms than the plates illustrated. A different type of torque sensing device may also be employed in combination with the torque limiting device, although that shown provides exceptional advantages.

Those skilled in the art will appreciate that these and other changes and modifications can be made in the invention without departing from the spirit and scope thereof. The essential characteristics of the invention are defined in the appended claims.

I claim:

1. A two-way drive system comprising an input drive shaft mounted for rotation in either direction; an output shaft mounted for rotation in either direction; an irreversible drive means connected between said shafts which has greater frictional resistance in one direction of rotation than the other; and a rotatable two-way torque limiting device connected between said input shaft and said irreversible drive means, and having a higher torque limit in the direction of rotation in which irreversible drive means has the higher frictional resistance and a lower torque limit in the opposite direction of rotation in which irreversible drive means has the lower frictional resistance.

2. A two-way drive system adapted to provide substantially the same output torque limit in either direction of rotation comprising an input drive shaft mounted for rotation in either direction; an output shaft mounted for rotation in either direction; an irreversible drive means connected between said shafts which has greater frictional resistance in one direction of rotation than in the other; and a rotatable two-way torque limiting device connected between said input shaft and said irreversible drive means, and having a higher torque limit in the direction of rotation in which said irreversible drive means has the higher frictional resistance and a lower torque limit in the opposite direction of rotation in which said irreversible drive means has the lower frictional resistance, the difference in torque limits being so related to the difference in frictional resistance of the irreversible drive means that the maximum torque provided by the output shaft in one direction of rotation is the same as in the other direction of rotation.

3. The two-way drive system of claim 1 in which said rotatable two-way torque limiting device comprises a first rotatable member adapted to be rotated in either direction, a second rotatable member mounted coaxially of said first member and adapted to be rotated in either direction, one of said members being the driving member and connected to said input drive shaft and the other of said members being the driven member and connected to said irreversible drive means, first clutch means associated with and adapted to positively rotate with said first rotatable member in either direction, said first clutch means including at least two clutch engaging surfaces, and second clutch means associated with said second rotatable member and comprising at least one element mounted to positively rotate with said second rotatable member in either direction and adapted to engage one of said clutch engaging surfaces of said first clutch means in driving relation but to slip relatively thereto under an overload torque in either rotational direction, said second clutch means also comprising at least one element adapted to positively rotate with said second member in one direction of rotation and to slip relatively to said second member in the opposite direction of rotation and also adapted to engage the other clutch engaging surface of said first clutch means in driving relation but to slip relatively thereto under an overload torque when positively rotating with said second rotatable member.

4. The two-way drive system of claim 1 in which said rotatable two-way torque limiting device comprises a first rotatable member adapted to be rotated in either direction, a second rotatable member mounted coaxially of said first rotatable member and adapted to be rotated in either direction, one of said members being the driving member and connected to said input drive shaft and the other of said members being the driven member and connected to said irreversible drive means, first clutch means comprising a plurality of clutch plates adapted to be positively rotated with said first member in either direction, and a second clutch means comprising a first group of at least one clutch plate adapted to frictionally engage the clutch plates of said first clutch means and being adapted to positively rotate with said second member in either direction, said second clutch means also comprising a second group of at least one clutch plate adapted to frictionally engage the clutch plates of said first clutch means and being adapted to positively rotate with said second member in one direction only and to slip rotationally relatively to said second member in the opposite direction, whereby when said first and second members rotate in the direction in which the clutch plates of said first and second groups of said second clutch means rotate positively with said second rotatable member, torque is transmitted between said first and second members by frictional engagement of all clutch surfaces of said second clutch means with those of said first clutch means and is limited by overload torque sufficient to cause all plates of said second clutch means to slip relatively to those of said first clutch means, while when said first and second members rotate in the opposite direction torque is transmitted therebetween by frictional engagement of the first group of clutch plates of said second clutch means with the clutch plates of said first clutch means and is limited by overload torque sufficient to cause said first group of clutch plates of said second clutch means to slip relatively to the clutch plates of said first clutch means.

5. A two-way drive system comprising a rotatable drive shaft; a power source adapted to rotate said drive shaft in either direction of rotation; a two-way torque sensing device connected between said power source and said drive shaft and adapted to permit rotation of said shaft by said power source in either direction only if said power source is developing torque greater than a predetermined amount; an irreversible drive means adapted to be rotated in either direction by said drive shaft and having higher frictional resistance in one direction of rotation than the other; and a two-way torque limiting device connected between said drive shaft and said irreversible driving means having a higher torque limit in the direction of rotation in which said irreversible drive means has the higher frictional resistance and a lower torque limit in the opposite direction of rotation in which said irreversible drive means has a lower frictional resistance.

6. A two-way drive system comprising a rotatable drive shaft; a power source adapted to rotate said drive shaft in either direction of rotation; a two-way torque sensing device connected between said power source and said drive shaft and adapted to permit rotation of said shaft by said power source in either direction only if said power source is developing torque greater than the predetermined amount; an irreversible drive means adapted to be rotated in either direction by said drive shaft and having higher frictional resistance in one direction of rotation than the other; and a two-way torque limiting device connected between said drive shaft and said irreversible driving means having a higher torque limit in the direction of rotation in which said irreversible drive means has the higher frictional resistance and a lower torque limit in the opposite direction of rotation in which said irreversible drive means has a lower frictional resistance; and means for halting operation of said power source when the torque limit is exceeded in either direction of rotation.

7. The two-way drive system of claim 5 in which said rotatable two-way torque limiting device comprises a first rotatable member adapted to be rotated in either direction, a second rotatable member mounted coaxially of said first member and adapted to be rotated in either direction, one of said members being the driving member and connected to said drive shaft and the other of said members being the driven member and connected to said irreversible drive means, first clutch means associated with and adapted to positively rotate with said first rotatable member in either direction, said first clutch means including at least two clutch engaging surfaces, and second clutch means associated with said second rotatable member and comprising at least one element mounted to positively rotate with said second rotatable member in either direction and adapted to engage one of said clutch engaging surfaces of said first clutch means in driving relation but to slip relatively thereto under an overload torque in either rotational direction, said second clutch means also comprising at least one element adapted to positively rotate with said second member in one direction of rotation and to slip relatively to said second member in the opposite direction of rotation and also adapted to engage the other clutch engaging surface of said first clutch means in driving relation but to slip relatively thereto under an overload torque when positively rotating with said second rotatable member.

8. The two-way drive system of claim 5 in which said rotatable two-way torque limiting device comprises a first rotatable member adapted to be rotated in either direction, a second rotatable member mounted coaxially of said first rotatable member and adapted to be rotated in either direction, one of said members being the driving member and connected to said input drive shaft and the other of said members being the driven member and connected to said irreversible drive means, first clutch means comprising a plurality of clutch plates adapted to be positively rotated with said first member in either opposite direction, and a second clutch means comprising a first group of at least one clutch plate adapted to frictionally engage the clutch plates of said first clutch means and being adapted to positively rotate with said second member in either opposite direction, said second clutch means also comprising a second group of at least one clutch plate adapted to frictionally engage the clutch plates of said first clutch means and being adapted to positively rotate with said second member when it rotates in one direction only and to slip rotationally relatively to said second member when it rotates in the opposite direction, whereby when said first and second members rotate in the direction in which the clutch plates of said first and second groups of said second clutch means rotate positively with said second rotatable member, torque is transmitted between said first and second members by engagement of all clutch surfaces of said second clutch means with those of said first clutch means and is limited by overload torque sufficient to cause all plates of said second clutch means to slip relatively to those of said first clutch means, while when said first and second members rotate in the opposite direction torque is transmitted therebetween by frictional engagement of the first group of clutch plates of said second clutch means with the clutch plates of said first clutch means and is limited by overload torque sufficient to cause said first group of clutch plates of said second clutch means to slip relatively to the clutch plates of said first clutch means.

References Cited in the file of this patent

UNITED STATES PATENTS

| 1,938,720 | Preble | Dec. 12, 1933 |
| 2,905,289 | Lee et al. | Sept. 22, 1959 |

FOREIGN PATENTS

| 753,732 | Great Britain | Aug. 1, 1956 |